Patented Feb. 12, 1952

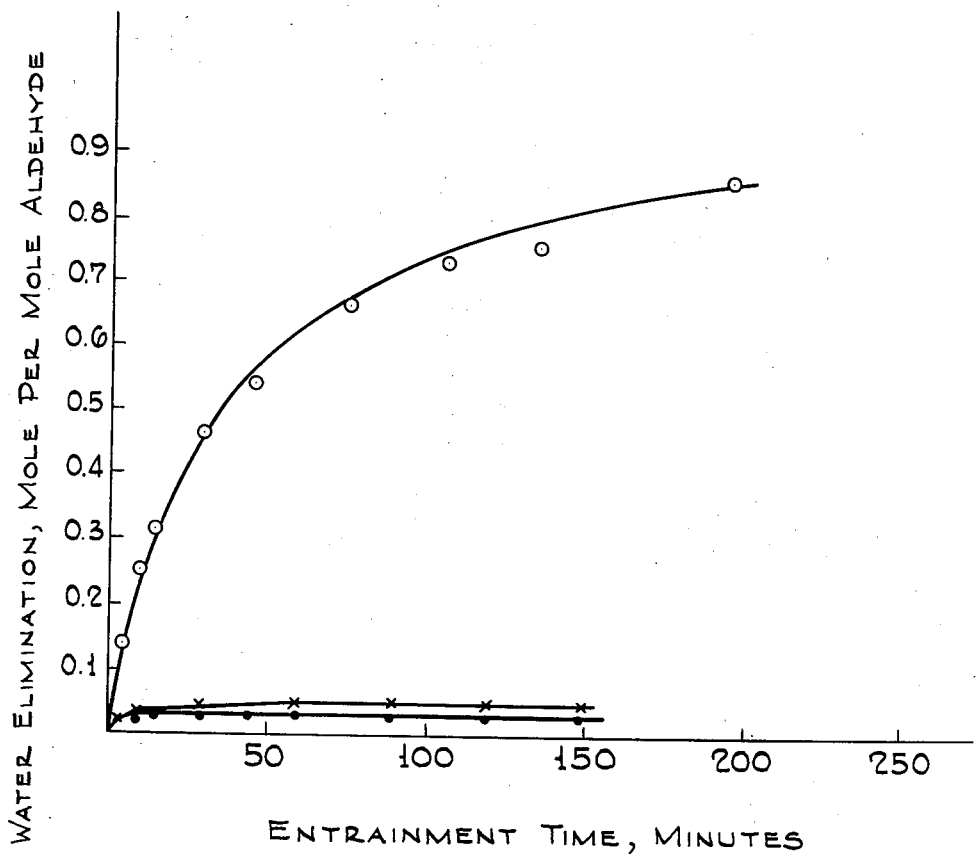

2,585,816

UNITED STATES PATENT OFFICE 2,585,816

METAL TREATMENT OF OXO ALCOHOLS

Joseph K. Mertzweiller, Baton Rouge, La., assignor to Standard Oil Development Company, a corporation of Delaware Application June 1, 1950, Serial No. 165,407

9 Claims. (Cl. 260—643)

This invention relates to a solid-liquid treatment method for impure alcohols, particularly with respect to the purification of finished alcohol products with a view to the improvement of color qualities of both the alcohol and its chemical derivatives. Specifically, this invention is directed to a novel process for the purification of alcohol products obtained by the catalytic reaction of olefins with hydrogen and carbon monoxide to give reaction mixtures which consist substantially of carbonyl compounds which are subsequently hydrogenated in the presence of a sulfur-insensitive hydrogenation catalyst in order to convert the carbonyl groups substantially completely to alcoholic hydroxyl groups.

It has been discovered that impure alcohols such as those obtained from synthesis processes and especially the Oxo synthesis, can be purified as to color-producing impurities by treatment under specific conditions of temperature and time in a solid-liquid two phase system employing as the solid treating agents certain selected active metals. Preferably, the treated alcohol is subjected to a subsequent distillation following the treatment in order to give a completely satisfactory alcohol product.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as acetals, hemiacetals, and esters. The carbonyl compounds which predominate in the product are then usually subjected to hydrogenation in a second stage to produce the corresponding alcohols, usually in a rather impure state.

Practically all types of organic compounds having an olefinic double bond may be used as starting materials to the first or oxonation stage including aliphatic olefins and diolefins, cycloolefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable reaction conditions include temperatures of about 150°–450° F., pressures of about 100 to 300 atm., $H_2$:CO ratios of about 0.5–4.0 to 1, liquid feed rates of about 0.5–5 v./v./hr., and gas feed rates of about 1,000–45,000 standard cu. ft. of $H_2+CO$ per barrel of liquid olefinic feed.

The hydrogenation stage may be operated at conventional hydrogenation conditions which include temperatures, pressures, gas and liquid feed rates approximately within the ranges specified above for the first stage. Various known types of hydrogenation catalysts including nickel, tungsten, molybdenum, their oxides and sulfides and others may be used. These catalysts may be supported on some suitable carrier such as charcoal. The liquid product from the hydrogenation stage is worked up by distillation to separate the desired alcohols from unconverted olefinic feed material, unhydrogenated carbonyl compounds, and hydrocarbons formed in the process.

The overall carbonylation or so-called "Oxo" reaction, as outlined above, provides a particularly effective method for preparing valuable primary alcohols, particularly of the $C_4$ to $C_{12}$ range. One of the largest and most important uses developed for the synthetic alcohol products is that of producing esters suitable for plasticizers, by reaction with both aliphatic and aromatic acids or anhydrides, including such examples as phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range, and particularly, the octanols and the nonanols.

Serious difficulties have been encountered in the hydrogenation stage as a result of sulfur poisoning of the hydrogenation catalyst, when the catalysts used are those such as nickel and others which are sulfur sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and even completely destroy catalyst activity unless sulfur-insensitive catalysts are used. The sulfur-sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, and tungsten sulfide. While these catalysts have the decided advantage of avoiding the inactivation due to sulfur content of the feed stock, they also possess the disadvantage that they permit the sulfur to pass unchanged through the hydrogenation zone and, indeed, in many cases, tend to introduce additional sulfur contamination into the alcohol. Thus, the final crude alcohol may have a total sulfur content from 30 to 100 P. P. M. or in some cases, an even higher value if no sulfur clean-up operations are done.

In general, the entire content of the sulfur which is present in the synthetic Oxo alcohols is in the form of organically combined sulfur. Although the exact type of organic impurities in which the sulfur occurs has not been fully determined, it is believed that the sulfur is present in a variety of forms and that in general, it is deleterious in all these forms when occurring in the final alcohol, although certain types of organically combined sulfur are definitely known to be more undesirable than are other sulfur impurities. The more highly alkylated and less acidic sulfur materials appear to be less active in producing colored impurities in stainless steel and other types of metallic equipment. Furthermore, it has been found that in general the sulfur present in which the valence of the sulfur indicates it to be in a more highly oxidized form is less injurious than the sulfur which is present in a relatively reduced valence state. The finished alcohol should contain a minimum of sulfur-containing compounds and particularly those in which the sulfur is relatively more acidic and in a relatively more reduced state. It is also a better practice to remove a major portion of the carbonyl compounds in order to obtain alcohols which give commercially acceptable ester plasticisers. Some such purification is especially necessary if the ester is manufactured in stainless steel equipment and unreacted or excess alcohol is recycled to the esterification zone. A number of types of sulfur-containing impurities are believed to be present and among these probable in an isooctyl alcohol product prepared from a $C_7$ olefin, are isooctyl mecaptan, isooctyl sulfide, diethyl sulfide, diethyl disulfide, diisopropyl sulfide, diisopropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials including sulfur-containing impurities have the opportunity to build up during the recycle stages to a point at which they must be purged from the system before continuing the recycling operation. This presents impurity problems which occur even though the actual reaction is carried out in corrosion-resistant or glass-lined equipment. The high temperature esterification is a much more severe test as to the purity and stability of the reactants and is more truly representative of typical plant scale esterification conditions.

Perhaps the most important commercial use for these higher molecular weight alcohols, such as the $C_8$ isooctyl alcohols produced by the Oxo reaction, is in esterification reactions to form compounds of the diester type for use as plasticizers in resin and plastic compositions. Those of the phthalate and adipate type are widely manufactured. Even though an alcohol product of a synthetic source appears to be colorless, it frequently contains small amounts of impurities which form colored bodies during the subsequent acid-alcohol reaction. These colored materials are difficult to remove from the resulting high-boiling ester products and result in inferior esters which require additional and excessive purification prior to their use as plasticizers.

These esters are prepared in standard type esterification equipment employing reactors made of stainless steel or other metal, or in some cases, in glass-lined reaction vessels.

In a number of instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be caused by impurities present in the alcohol product and certain of them are caused particularly by the sulfur products present in the alcohol, although other materials which can effect ester color and odor include polymerized and condensed higher molecular weight impurities as well as unreduced carbonyl compounds and other nonalcoholic compounds. In fact, it has been found that, in order to obtain a high grade alcohol which adequately meets all specifications, the active, color-producing sulfur content should best be reduced to a value somewhere near 5 parts per million, although somewhat higher total sulfur concentrations can be tolerated, the exact limit of tolerance depending partially upon the form in which the sulfur occurs. Only certain types of the sulfur-containing impurities seem to be among the most active color formers.

There are regularly used a number of modified esterification procedures. Two of the main ones which are widely used for preparation of the dioctyl phthalate ester include the high temperature method in which the one mole of phthalic anhydride is heated with approximately 2 to 2.4 moles of octyl alcohol. The ester may be prepared in a number of ways. In one such method, the ester is recovered by distilling, first, the unreacted alcohol and anhydride under reduced pressure, then finally, if it is so desired, by distilling the ester. However, it is preferred to use the ester without distilling it, and this can be done if the alcohol used in the esterification is of sufficient purity. Although a number of finishing techniques are used, in all cases unreacted alcohol is distilled off for recycle. The catalytic method in which benzene sulfonic acid or a similar type material is used as a catalyst may be employed to give catalytic esterification at a lower temperature. The color degradation of isooctyl alcohol during esterification has also been found to be a function of time and completeness of esterification. The highly purified isooctyl alcohol products, such as those made from alcohol purified through the borate ester or prepared over a sulfur-sensitive metallic hydrogenation catalyst, show practically no color degradation in any method of esterification. Such refined methods of production are, however, prohibitively expensive for large scale commercial production. The ester color can be expressed in terms of a Hazen ester color number, a high number indicating a darkened, low quality ester product. An alcohol having a Hazen ester color of 75 to 150 is considered acceptable for commercial use. This standard test for ester color is described in the literature and is reported in A. S. T. M. D-268-46.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the $KA_2S$ stainless steel type, the surface of which has been prepared by sand blasting. This test is considered to be the most rigorous and gives the most complete test of alcohol quality when the impurities being tested for are of the sulfur type.

It has been discovered that these undesirable characteristics, especially those tending to form colored byproducts during the preparation of derivatives of primary Oxo alcohols, can be essentially eliminated and a high grade of synthetic alcohol produced by means of a novel purification treatment. This novel method of treatment is carried out by contacting the liquid alcohol with the so-called crude alcohol, by which term is meant to describe alcohol taken directly from the hydrogenation step, or the finished alcohol, by which term is meant an alcohol product which has been subjected to at least one distillation in which the lighter products consisting mainly of hydrocarbons are removed, with a solid treating agent which consists essentially of certain selected active metals either in a supported or unsupported form.

It has been discovered by actual experimentation in which a large amount of data were collected that only a restricted number of metals are active in being able to produce beneficial purification effect of removing or rendering innocuous the color-producing impurities. The color-producing impurities, believed to be most affected by this treatment, are the undesirable sulfur compounds. However, other types of impurities are also removed or rendered more or less harmless. The beneficial results which are obtained in the treatment are strikingly manifested by a reduction in the overall sulfur content of the treated alcohol as well as by the surprising improvement in color of such esters as the phthalate ester when produced in esterification reactions using the treated alcohol. Color developed during such esterification reactions may be measured in a number of ways, including a phthalate ester color value, generally the reaction being carried out in the presence of stainless steel, either in strip or powder form, with a measurement of the color adsorption at a standard wave length value. Preferably, the treatment with active metals is followed by a redistillation step in which the Oxo alcohol is recovered substantially completely with only minor amounts of metal being lost during the metal treatment or being discarded at the beginning and/or the end of the rerunning operation.

The types of active metals which are particularly preferred for treating the impure sulfur-containing alcohols produced by an Oxo reaction include copper metal either as a powder or in some other convenient contacting form, nickel metal, particularly the type of metal known commercially as Raney nickel, free mercury when used in conjunction with caustic, particularly sodium hydroxide and cobalt.

Certain other metals, although they do not give outstanding results, give some improvement in quality when used for treatment of sulfur-containing alcohols. These metals having lower activity but showing a degree of effectiveness, include iron, silver, used either alone or in conjunction with sodium hydroxide, sodium, aluminum, and certain alloys such as Devarda's metal, a commercial product containing aluminum, zinc, and substantial quantities of copper. In the latter case, the copper or possibly the aluminum contained in the alloy may be the effective treating agent. Thus, in certain instances, it may be possible to use, not the free metal as such, but some conveniently available alloy containing suitable amounts of the free metal which is effective and containing no interfering materials which would prevent the action of the metal when contacted with the alcohol. Although it is not desired to limit this invention to any particular chemical theory to explain the surprising results which are obtained from the specific metals under selective and critical conditions of the treatment, it is believed that it is at least probable that the metals which give the best treating action are those which are most active in the removal of sulfur as shown by the reduced sulfur content of the treated alcohol, and that this sulfur removal actually takes place by some type of chemical affinity which the free metal has for the sulfur to give a metal sulfur compound as, for instance, the corresponding metal sulfide.

As an additional improvement feature of the invention, it has been noted that the odor of the Oxo alcohol and of the derivatives prepared therefrom, is substantially improved following the active metal agent.

In general, the treatment method can be carried out by contacting the impure liquid Oxo alcohol with the solid metals under conditions which assure adequate and intimate contacting of the impure alcohol with the treating agent. Any commonly used method for achieving such contact of liquids and solids may be employed to carry out the treating, rapid and complete mixing of the two phases being a necessary feature of the mechanical operation. In certain cases, it may be possible to use the solid treating material as a bed and in many cases, it may be desirable to use an inert support for the metallic treating material upon which the material is suspended. A fluidized bed of metal may also be employed for contacting the alcohol with the Oxo alcohol.

Suitable supports include such inert carriers as silica gel, corundum, carbon, aluminum oxide, and similar types of materials. Another method by which this process can be advantageously carried out is by carrying out a distillation of the impure alcohol in the presence of the metal, allowing sufficient time for contacting of the alcohol with the metal to accomplish the desired sulfur removal. A further general method for the contacting process is carried out by the use of a very fine dispersion of the solid metal in the liquid alcohol.

Although there are no critical limits of pH values which affect the treatment as to the quality of alcohol obtained, it is considered in general best to carry out the contacting of the active metal with the impure alcohol under conditions which are substantially neutral. In some cases, however, notably those involving the use of mercury metal and silver metal, it has been found advantageous to use moderate amounts of sodium hydroxide or some other alkaline agent in conjunction with the treatment of the alcohol with the active metal. In general, it is best to avoid the use of other materials besides the metal if good results can be otherwise obtained. In some cases where sodium hydroxide is not used directly with the treatment, an after wash of the alcohol with an aqueous alkaline solution may be helpful in obtaining better quality alcohol. Acidic conditions are generally best avoided.

It is unnecessary to have any free hydrogen present during the contacting of the alcohol with the metal and indeed, it may interfere with the treatment efficiency to have substantial amounts of hydrogen present. Thus, this process can in no way be regarded as a secondary hydrogenation of the alcohol.

With regard to temperature limitations of the treatment, it is advisable to use a treating temperature as low as possible and yet at the same time accomplish the desired purification results. For the most active treating agents, for instance, finely-divided copper powder, room temperatures have been found to be adequate, provided the time of exposure of the alcohol to the metal is adequate. Broadly speaking, the higher the temperature, the shorter the contact time which will be required to accomplish comparable purification results, although the correlation between time and temperature is in no way a perfect one, depending upon other variables such as specific components of the alcohol itself, the impurities and the particular treating agent being used. Treating temperatures of from about 25° to 180°–190° C. have been employed with satisfactory results. The higher temperatures, that is, those around the boiling point of the alcohol, for instance, temperatures of 180° C., for $C_8$ isooctyl alcohol have been found to be very effective when the alcohol is contacted for a short period of time with one of the more active treating metals. The lower the temperature which can be used, the less danger there is for destroying a part of the alcohol itself during the treatment, thereby lowering the overall final recovery of the alcohol. Treating time should be controlled in order to balance the results against the efficiency of operation. Treating times of from one to two hours have generally been found sufficient to give an acceptable quality of alcohol. A maximum time of six hours of exposure of alcohol to the metal is generally required for the sake of economy and operational advantages.

With regard to the proportions used in contacting the alcohol, limited variations will be found to be useful, depending upon the exact source of the alcohol, the components and impurities contained therein, the treating agent being used, the use of an additional agent such as caustic, the temperature, and the composition of sulfur-containing impurities which it is desired to remove. It has been found that the use of about 10% to 50% by weight of the solid contacting agent based upon the total amount of alcohol being treated, will, in most cases, be adequate. In certain cases, a very high proportion of metal to crude alcohol was found to be actually harmful to the purification and gave an alcohol of a quality inferior to the untreated product.

Although it is possible and may be more convenient to use the crude alcohol in the treatment prior to a topping operation in some cases, this practice is undesirable since it involves the exposure of the total Oxo alcohol from the hydrogenation stage, including the low-boiling components which are mainly hydrocarbons, to the treating reaction. Thus, it is better to employ as a feed to the treating process a topped Oxo alcohol, that is, one from which lower-boiling materials have been removed at least partially. It is preferred for the best results to treat only a finished or distilled alcohol, that is, an alcohol product which has been subjected to at least one distillation.

It has further been found that following the active metals treatment, the alcohol will require a further distillation in order to obtain a product of the most desirable quality for the production of color-free esters. In general, a conventional type distillation using an ordinary fractionating column will be sufficient for distilling the alcohol following the treatment. It is to be further noted that in some cases in which the active metal may become dispersed in the alcohol or in the impurities therein, a washing operation or some separation step may be required in order to remove the dissolved or suspended solid from the alcohol prior to a redistillation step.

It is a further advantage of this invention that the alcohol which is used as the starting feed is recovered in high purity with a substantially reduced content of sulfur and, particularly, with a reduction in the color-forming impurities of the alcohol. As a further advantage, the recovery of useful purified alcohol is practically quantitative following the treatment since the active metals preferred for the treating operation show negligible absorbency for the alcohol and are also relatively insoluble in the alcohol product, thus minimizing any losses which might otherwise occur by such treatment.

The invention will be better understood in conjunction with the detailed examples given below.

EXAMPLE I

A crude isooctyl alcohol prepared by the oxonation of a $C_7$ olefin stream using carbon monoxide and hydrogen in the presence of an oxonation catalyst and followed by catalytic hydrogenation of the aldehyde product over a 10% $MoS_2$ on charcoal to give a mixture predominantly C₈ primary alcohols but containing difficultly removable impurities of the sulfur-containing class was treated with a UOP nickel catalyst. The treatment was carried out by refluxing the alcohol with 19 wt. per cent of the UOP nickel catalyst for a period of six hours at a temperature of 100° C. No hydrogen or inert gas was used which would in any way affect the treatment by the nickel or would serve as an additional hydrogenation. The UOP nickel catalyst consists of about 60% nickel metal supported on kieselguhr. Table I below shows the results of distillation of the untreated crude hydrogenated product and a similar distillation of the crude product following treatment with the nickel catalyst. The marked improvement in alcohol odor given by the treatment is also indicated in Table I shown below.

Table I

| Treatment of Crude Hydrogenated Product | None | Treated with UOP Nickel Catalyst |
| --- | --- | --- |
| *Distillation of Product:* | | |
| IBP–215° F. Vapor Temp., Wt. Per Cent. | 16.00 | 18.22. |
| 215–265° F | 4.36 | 5.35. |
| 265–350° F | 0.39 | 0.32. |
| 350–374° F | 57.86 | 56.30. |
| Bottoms | 19.90 | 18.88. |
| Water | 1.49 | 0.93. |
| Alcohol Odor | Typical of Alcohol Hydrogenated over a sulfur-insensitive Catalyst. | Almost Equivalent Alcohol Hydrogenated over a sulfur-sensitive Catalyst. |

The acetalization characteristics of these alcohols were determined by refluxing 1 mole of 2-ethyl-hexaldehyde with 2 moles of the alcohol and 250 cc. of benzene. Water was continuously removed and the temperature was maintained at 220±5° F. The plots of water elimination (mole of water per mole of aldehyde) against time gives an index of acetal formation. No catalysts are added in this acetal formation test. The entrainment curves for the treated and untreated alcohols referred to above and for an alcohol obtained by hydrogenation over UOP nickel catalyst having free hydrogen present in the hydrogenation zone are given in the accompanying figure. The treated alcohol is equivalent to that hydrogenated over UOP nickel in this property. The acetalization reaction is catalyzed by small quantities of acidic sulfur compounds present in the alcohol. This property is also important in connection with storage characteristics of the alcohol. In the presence of acidic catalysts promoting acetalization, the free carbonyl compounds present in the alcohol are converted by reaction with the alcohol to the high molecular weight acetals, which in concentrations of 0.5–1.5% are sufficient to exceed the dry point specifications.

EXAMPLE II

Using an untreated isooctyl alcohol having from 58–68 P. P. M. of sulfur and an ester adsorption of 1.2+ at 4470 Å, a similar contacting treatment was carried out by exposing the impure alcohol to Raney nickel using 8.3 grams of nickel per liter of alcohol. The treating time was approximately one hour and the temperature was 175° C. The resulting alcohol had a sulfur content of 10 P. P. M. following a rerunning operation at atmospheric pressure.

EXAMPLE III

When a crude alcohol having 83 P. P. M. of sulfur and showing a Hazen color of over 1,000 in the stainless steel strip test, was treated with solid nickel metal for about one hour at the reflux temperature of the alcohol, the treated alcohol following a rerun operation was found to show an ester color of approximately 300 after a two hour esterification in the stainless steel strip test.

EXAMPLE IV

About 200 cc. of isooctyl alcohol which had an initial sulfur content of 83 P. P. M. and exhibited a Hazen color of over 1,000 in the stainless steel strip test was treated with a 20% sodium hydroxide solution and about two pounds of mercury. The mixture was shaken and warmed at steam bath temperature for about two hours. The temperature was approximately 90° C. Following the treatment, the alcohol was filtered, washed, and rerun. It was then esterified for about two hours in the presence of a steel strip. The phthalic ester Hazen number was found to be about 100, while that of the untreated alcohol was about 1100.

In a similar type experiment in which mercury and 30% sodium hydroxide was used to treat a sulfur-containing isooctyl alcohol at steam bath temperatures, the phthalate ester color was likewise found to be about 100.

EXAMPLE V

A plant finished alcohol containing 83 P. P. M. of sulfur gave a crude phthalate ester with a Hazen color of more than 1000 when esterified in the presence of a stainless steel strip. A two plate distillation was carried out on this material to eliminate 5% front ends and 15% heavy ends. The 80% heart cut so obtained had a stainless steel phthalate ester color of 800 and 1100. Treating with copper metal under conditions shown in Table II gave marked improvement in quality of ester products from the treated alcohol.

Table II

| Treating Agents | Time, Hrs. | Approx. Temp., ° C. | Rerun | Hazen Color 2 Hr. Esteriless Steel Strip |
| --- | --- | --- | --- | --- |
| Cu | 2 | Elevated Temp. (180° C.) | Yes | 400 |
| Cu | 1 | Room Temp | Yes | 250 |
| Cu | 1 | do | No | 600 |
| 1% Cu | | | Yes | 400 |

EXAMPLE VI

In a similar way isooctyl alcohol prepared by the Oxo reaction, the alcohol containing about 83 P. P. M. of sulfur and giving a stainless steel strip test of about 1,000, was treated with copper metal powder to give good results in alcohol quality improvement. The exact conditions of treatment and the improvement in results obtained are shown in Table III below.

Table III

| v./v. | Treating Time, Hrs. | Approx. Temp., ° C. | Sulfur, P. P. M. | Phthalate Ester Color | Adsorption at 4470 Å. |
| --- | --- | --- | --- | --- | --- |
| 0.01 | 1 | 180–190 | 39 | 550 | 0.131 |
| 0.05 | 1 | 180–190 | 40 | 375 | 0.080 |

EXAMPLE VII

Copper reduced by hydrogen was also found to give good results when used to treat a sulfur-containing isooctyl alcohol. When this type of copper metal was used to treat the same crude alcohol as used in Example VI, employing for treatment 0.05 volume of treating material per volume of alcohol at one hour at temperatures of about 180°–190° C., the P. P. M. of sulfur was reduced to 27, the phthalate ester color was 300, and the light adsorption at 4470 Å was 0.062.

EXAMPLE VIII

It was likewise found that 10% copper metal supported on silica gel can be used to improve the quality of alcohol. Thus, when isooctyl alcohol containing sulfur was distilled in the presence of 5% of 10% copper metal on silica gel, a phthalate ester color (Hazen) was reduced from over 1,000 to about 400 and the adsorption of light of the ester at 4470 Å. was only 0.090.

EXAMPLE IX

When a crude $C_8$ Oxo alcohol containing 58–68 P. P. M. of sulfur and showing at 4470 Å. an ester adsorbency of light of 1.2 was treated with copper metal using about 10 grams per liter of alcohol for one hour at reflux temperature of the alcohol, the sulfur content was reduced to 29 P. P. M. and the adsorbency was 0.24 following rerunning of the treated alcohol at atmospheric pressure.

In an experiment in which similar conditions as described above were used but in which the treatment was followed by a sodium hydroxide washing, a still greater improvement was noted from the copper treatment. Thus, the P. P. M. of sulfur was found to be about 20 and the light adsorption was 0.18 after the treatment.

EXAMPLE X

It was also discovered that certain types of alloys containing the metals found to be active when used alone for treatment can be used. For instance, Devarda's metal (59% aluminum—39% copper—2% zinc) when used in a quantity of approximately 9 grams per liter of alcohol being treated, for contacting at temperatures of about 180° C. for one hour, was found to give quite satisfactory results in quality improvement. The P. P. M. of sulfur of the treated alcohol following a rerunning operation was about 9 and the adsorption at 4470 Å. was 0.13.

What is claimed is:

1. A process for the treatment of an impure $C_4$–$C_{12}$ alcohol which was produced in a two-stage operation consisting of a first stage in which hydrogen, carbon monoxide, and an olefin are contacted in the presence of an oxonation catalyst, forming a product predominantly aldehyde and of a second stage in which the said aldehyde product is catalytically reduced with hydrogen to form the corresponding alcohol which consists of the liquid-solid contacting of the alcohol with a metal treating agent selected from the group consisting of mercury, copper, and nickel, at temperatures of from 25°–180° C. and for a period of time sufficient that undesirable impurities particularly those of the sulfur-containing class are rendered substantially harmless particularly as to color-producing tendencies in subsequent reactions of the alcohol.

2. A process such as that described in claim 1 in which the treated alcohol is subjected to a distillation following the metal treating process.

3. A process for the treatment of a $C_8$ alcohol prepared by the Oxo process and from which substantially all components more volatile than the alcohol have been removed, which consists of the liquid-solid contacting of the topped alcohol with a metal selected from the group consisting of mercury, copper, and nickel, at temperatures of from 25°–180° C., for a period of time of from one to six hours, whereby undesirable impurities particularly those of the sulfur-containing class are rendered substantially harmless as color-producing bodies in subsequent reactions of the alcohol and the total sulfur content of the topped alcohol is substantially reduced by the treatment.

4. A process such as that described in claim 3 in which the treated alcohol is subjected to at least one distillation following the metal treating process.

5. A process for the treatment of an Oxo $C_4$–$C_{12}$ alcohol having from four to twelve carbon atoms which was produced in a two-stage operation consisting of a first stage in which hydrogen, carbon monoxide, and an olefin are contacted in the presence of an oxonation catalyst forming a product predominantly aldehyde and of a second stage in which the aldehyde product is catalytically reduced with hydrogen to form the corresponding alcohol and from which components more volatile than the Oxo alcohol have been removed, which consists of the liquid-solid contacting of the topped alcohol at temperatures of from 25°–180° C. and below the boiling point of the Oxo alcohol with a metal selected from the group consisting of mercury, copper, and nickel, for a period of time sufficient such that undesirable impurities particularly those of the sulfur-containing class are rendered substantially harmless as color-producing bodies in subsequent reaction to the alcohol.

6. A process such as that described in claim 5 in which the alcohol being purified is a $C_8$ alcohol.

7. A process such as that described in claim 5 in which the topped alcohol being purified is a $C_8$ alcohol, the metal used as a treating agent is mercury, and the treatment is carried out in the presence of substantial amounts of caustic.

8. A process such as that described in claim 5 in which the topped alcohol being purified is a $C_8$ alcohol, and the metal used as a treating agent is copper.

9. A process such as that described in claim 5 in which the topped alcohol being purified is a $C_8$ alcohol and the metal used in the treatment is nickel.

JOSEPH K. MERTZWEILLER.

REFERENCES CITED

The following references are of record in the file of this patent:

UNITED STATES PATENTS

| Number | Name | Date |
|---|---|---|
| 1,753,859 | Gray | Apr. 8, 1930 |
| 2,525,354 | Hoog et al. | Oct. 10, 1950 |

FOREIGN PATENTS

| Number | Country | Date |
|---|---|---|
| 278,777 | Great Britain | Oct. 10, 1927 |